US012412718B1

(12) United States Patent
McClung

(10) Patent No.: US 12,412,718 B1
(45) Date of Patent: Sep. 9, 2025

(54) HANDHELD CONTROL DEVICE TO MECHANICALLY OPERATE MOLDED CASE CIRCUIT BREAKERS FROM A DISTANCE

(71) Applicant: Charles Mark McClung, Elkview, WV (US)

(72) Inventor: Charles Mark McClung, Elkview, WV (US)

( * ) Notice: Subject to any disclaimer, the term of this patent is extended or adjusted under 35 U.S.C. 154(b) by 0 days.

(21) Appl. No.: 19/215,594

(22) Filed: May 22, 2025

(51) Int. Cl.
*H01H 71/52* (2006.01)
*H01H 71/70* (2006.01)

(52) U.S. Cl.
CPC ............ *H01H 71/52* (2013.01); *H01H 71/70* (2013.01); *H01H 2300/056* (2013.01)

(58) Field of Classification Search
CPC ..... H01H 71/52; H01H 2300/056; H01H 3/20
See application file for complete search history.

(56) References Cited

U.S. PATENT DOCUMENTS 1,718,398 A * 6/1929 Zaeske ...................... B25B 7/18
294/104
5,193,666 A 3/1993 Markowski
5,196,658 A 3/1993 Gula
5,272,296 A 12/1993 Robarge
6,288,348 B1 9/2001 Eberts
9,362,063 B2 * 6/2016 Farmer .................... H01H 3/20
10,516,222 B2 * 12/2019 Morin .................... H01R 11/14
2020/0273652 A1 8/2020 Seo

* cited by examiner

*Primary Examiner* — Vanessa Girardi
(74) *Attorney, Agent, or Firm* — Thomas | Horstemeyer, LLP

(57) ABSTRACT

Disclosed is a handheld control device (HCD) for remotely operating molded case circuit breakers. The HCD has an engagement fixture with a rectangular aperture for capturing a circuit breaker handle of a molded case circuit breaker. The fixture is attached to a central part of an actuating short arm. The actuating short arm is attached perpendicularly and pivotally to an elongated long arm that is of sufficient distance to protect an operator from hazardous arcing. Right and left elongated actuating members (e.g., rods, cables) extend along the long arm and attach to respective end portions of the actuating short arm. In one embodiment, a pivot handle manually moves the elongated actuating members to move the actuating short arm and consequently the fixture and handle. In another embodiment, a motor is controlled to move the elongated actuating members to move the actuating short arm and consequently the fixture and handle.

26 Claims, 12 Drawing Sheets

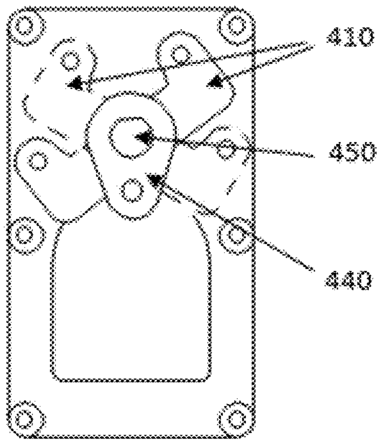
FIG. 12a
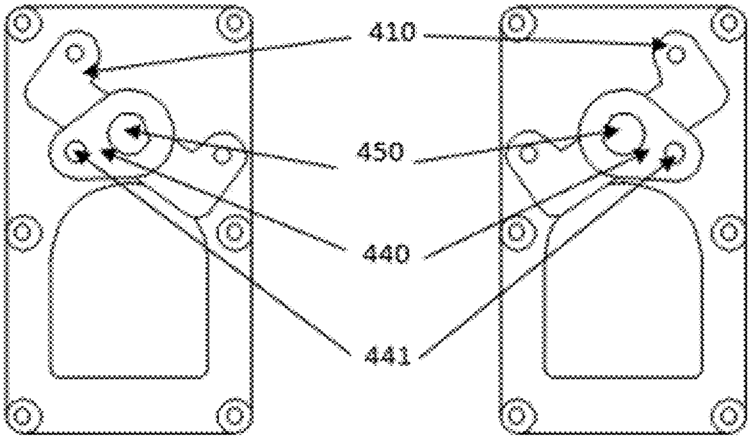
FIG. 12b
FIG. 12c

HANDHELD CONTROL DEVICE TO MECHANICALLY OPERATE MOLDED CASE CIRCUIT BREAKERS FROM A DISTANCE

FIELD OF THE INVENTION

The present invention generally relates to high power electrical circuits, and more particularly, to a portable handheld handheld control device (HCD) for safely operating molded case circuit breakers (MCBs).

BACKGROUND OF THE INVENTION

Throughout the world electrical distribution systems are equipped with molded case circuit breakers (MCBs) and/or molded case switches. MCBs provide the dual function of protecting circuits and equipment from overcurrent conditions, in addition to providing a means of switching a circuit on or off. MCBs are found in a variety of applications, e.g., panelboards, stand-alone devices, etc. MCBs also vary widely in physical size and electrical rating. Some MCB current ratings may be less than one ampere, while others may be rated well over 1000 amperes. The force required to operate the MCB varies widely, depending on the ampere rating and manufacturer's design.

As with most electrical switching operations, there is a risk of equipment failure and subsequent potential for severe personal injury. The hazards of an electrical arc-blast have been extensively studied and quantified by the Institute of Electrical and Electronic Engineers (IEEE 1584), and the National Fire Protection Association (NFPA 70E) prescribes methods for implementing safe work practices. Of all the available risk mitigations for arc-blast hazards, distance from the arc is the most desirable. Presently, there does not exist a portable handheld device for easily operating MCBs from an increased distance-most installations require operation by a human hand, thereby undesirably placing the individual in close proximity to the potential arc-blast.

SUMMARY OF THE INVENTION

Various embodiments of a portable, handheld, —handheld control device (HCD) are disclosed for safely operating an electrical molded case circuit breakers (MCBs) via remote operation at a distance. The HCD is designed to actuate the MCB having a circuit breaker handle that extends outwardly from the MCB and that is moved between an on position and an off position to respectively close and open a circuit.

In one embodiment, among others, the HCD has an engagement fixture with an aperture for capturing a circuit breaker handle of a molded case circuit breaker. The fixture is attached to a central part of an actuating first arm. The actuating first arm is attached perpendicularly and pivotally to an elongated long arm, or second arm, that provides distance to protect an operator from hazardous electrical arcing. Right and left elongated actuating members (e.g., rods, cables, etc.) extend along the long arm and attach to respective end portions of the actuating first arm. In one variation, a pivot handle can be manipulated manually to move the elongated actuating members to move the actuating first arm and consequently the fixture and handle. In another variation, a motor is controlled to move the elongated actuating members to move the actuating first arm and consequently the fixture and handle.

In another embodiment, among others, the HCD can be broadly summarized as comprising (a) a handle actuation means, (b) an elongated long arm, or second arm, and (c) a control means, as described hereafter: The handle actuation means enables removable engagement and disengagement of the circuit breaker handle and movement of the handle in a direction toward the on position and in an opposite direction toward the off position. The elongated long arm, or second arm, has a longitudinal body extending between a working end portion and a controlling end portion, and extends a distance to provide additional distance from an electrical arc exposure at the controlling end portion when the circuit breaker is actuated. Finally, the control means, which is situated at the controlling end portion of the elongated long arm, or second arm, enables control of the handle actuation means by the operator in order to selectively move the circuit breaker handle in the directions.

In one nonlimiting example, among others, the handle actuation means includes a circuit breaker handle engagement fixture having a body, the fixture body defining an aperture shaped and sized to receive therein the circuit breaker handle of the molded case circuit breaker. Moreover, an actuating short arm, or actuating first arm which has a longitudinal body extending between right and left end portions, is attached at a central part to the fixture body. Finally, right and left elongated actuating members, which each have a longitudinal body extending between controlling and working end portions, are moveably attached to a respective actuating short arm, or actuating first arm, end portion. Such a design enables realization of the handle actuation means.

In another nonlimiting example, among others, the control means includes a manually-operated cross handle. The cross handle has a longitudinal body extending between right and left end portions. The cross handle body is moveably attached to the long arm, or second arm. Moreover, each of the cross handle end portions is moveably attached to a respective controlling end portion of a respective elongated actuating member. In this design, the engagement fixture is capable of moving the circuit breaker handle when the cross handle is manually moved relative to the long arm, or second arm.

In yet another nonlimiting example, among others, the control means includes a motor-driven actuating arm having a longitudinal body extending between right and left end portions. The central part of the actuating arm is pivotally attached to the long arm, or second arm, while each of the pivot handle end portions is moveably attached to a respective controlling end portion of a respective elongated actuating member. The electric gear motor has a rotatable drive shaft. The motor-driven actuating arm is rotatable via the drive shaft in order to move forward and rearward each of the right and left end portions. Finally, a manually operated control switch is electrically connected to the motor to enable selective control of movement of the motor-driven actuating arm. With the foregoing design, the engagement fixture is capable of moving the circuit breaker handle when the motor-driven actuating arm is moved relative to the long arm, or second arm with the rotatable drive shaft.

Other embodiments, devices, apparatus, systems, methods, features, and advantages of the present invention will be apparent to one with skill in the art upon examination of the following drawings and detailed description. It is intended that all such additional embodiments, apparatus, methods, features, and advantages be included within this disclosure, be within the scope of the present invention, and be protected by the accompanying claims.

BRIEF DESCRIPTION OF THE DRAWINGS

The various embodiments and features of the invention will be clearly depicted in the following drawings. The components in the drawings are not necessarily to scale, emphasis instead being placed upon clearly illustrating the principles of the present invention. Moreover, in the drawings, like reference numerals designate corresponding parts throughout the several views. Implied components, or parts, such as wires, connections, fasteners, or the like, may be omitted for clarity without compromising the intent of the drawings.

FIG. 12*a* depicts the extent of free movement of the actuating arm when the driving element is in the neutral position.

FIG. 12*b* depicts the driving element moving the actuating arm to produce a pulling force on one of the actuating rods.

FIG. 12*c* depicts the driving element moving the actuating arm to produce a pulling force on the opposite actuating rod depicted in FIG. 12*b*.

DETAILED DESCRIPTION OF PREFERRED EMBODIMENT(S)

The present disclosure provides various embodiments of a portable handheld handheld control device (HCD) for operating molded case circuit breakers (MCBs) from a safe distance. The use of the (HCD) requires no modification, temporary or permanent, to the MCB that is to be operated. The (HCD) may be constructed to be operated from a manual force exerted by a human or by a force derived from an electrically-powered motor. The HCD provides for rapid operation of the circuit breaker in either direction, on or off, without the need to reposition the device. The HCD is suitable for operating MCB handles that are oriented to move in a horizontal or vertical direction.

To use the HCD, a human operator first engages the circuit breaker engagement fixture, mounted on the operating end of the device, with the MCB handle. The human operator will then manually displace the pivoting operating handle or activate the electric motor.

First Embodiment

Figure 1:
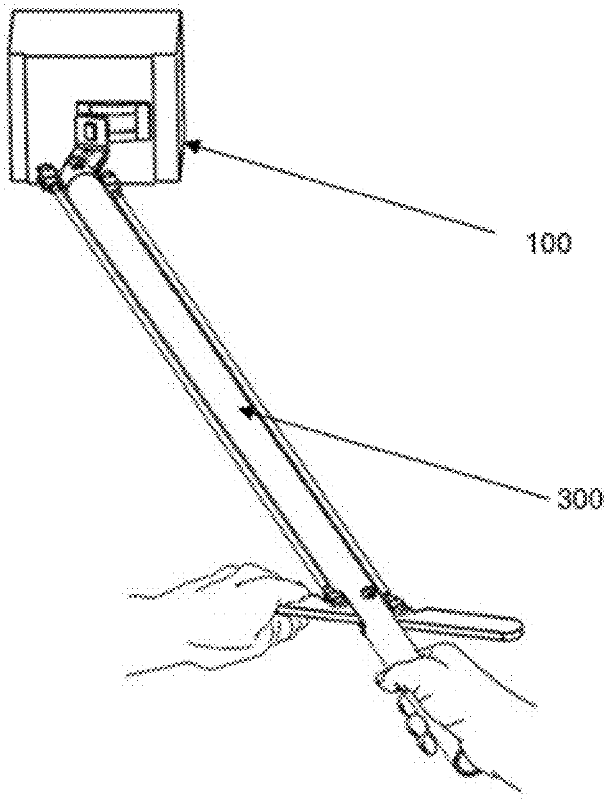
FIG. 1 is a perspective view of a first embodiment of a handheld control device (HCD) of the present disclosure, which can be used to operate a typical molded case circuit breaker (MCB), with the operating force being derived from a human operator.

With reference to FIG. 1, the HCD denoted by reference numeral 300 is depicted as it would be applied to operate a typical MCB 100. As shown, a human operator provides the force to operate the HCD 300 by holding the long arm (or mast) 200, with the right hand, as depicted, and using the left hand to push or pull the manual operating pivot handle 305 to effect the desired operation of the MCB 100.

Figure 2A:
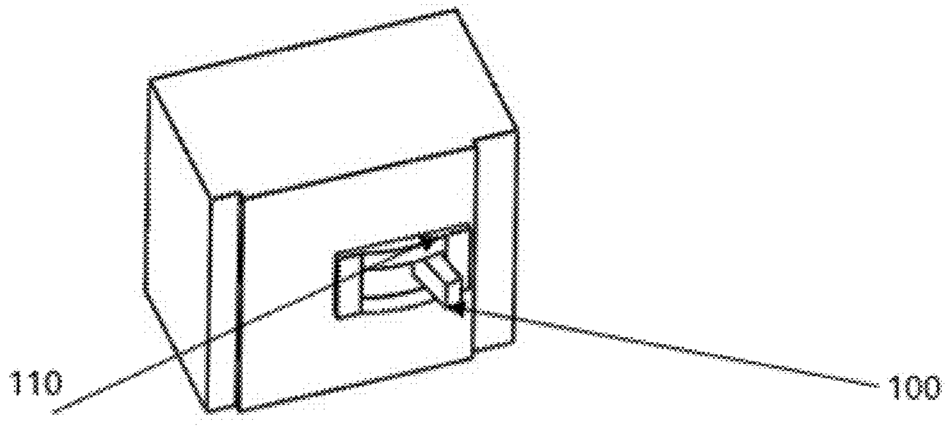
FIG. 2*a* depicts a common MCB.
Figure 2B:
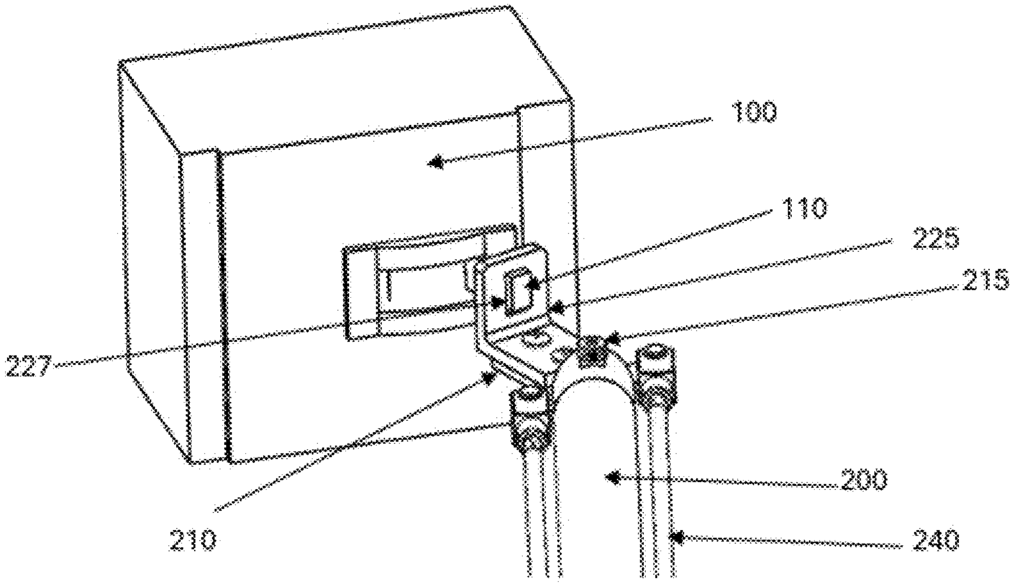
FIG. 2*b* is a close-up perspective view of the circuit breaker engagement fixture engaging the MCB handle.

FIG. 2*a* depicts a typical MCB 100. FIG. 2*b* is a close-up view of the HCD engaging the MCB handle 110. The circuit breaker handle engagement fixture 225 features an aperture 227, which preferably has a rectangular periphery whose dimensions are slightly greater that the dimensions of the MCB handle 110 and which is designed to capture the MCB handle 110. The circuit breaker handle engagement fixture 225 is affixed to the actuating short arm 210, which rotates about the actuating short arm pivot bolt 215 approximately 45 degrees to the left or right of center in the preferred embodiment. As shown in FIG. 2*b*, a force applied to the actuating rod 240 on the right side of the 'mast' 200 creates a torque on the actuating short arm 210.

Figure 3A:
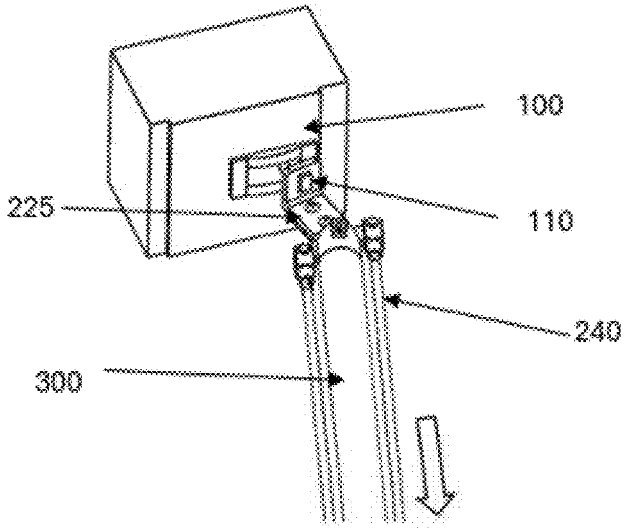
FIG. 3*a* is a perspective view of the portable actuator when the MCB is in the ON position.
Figure 3B:
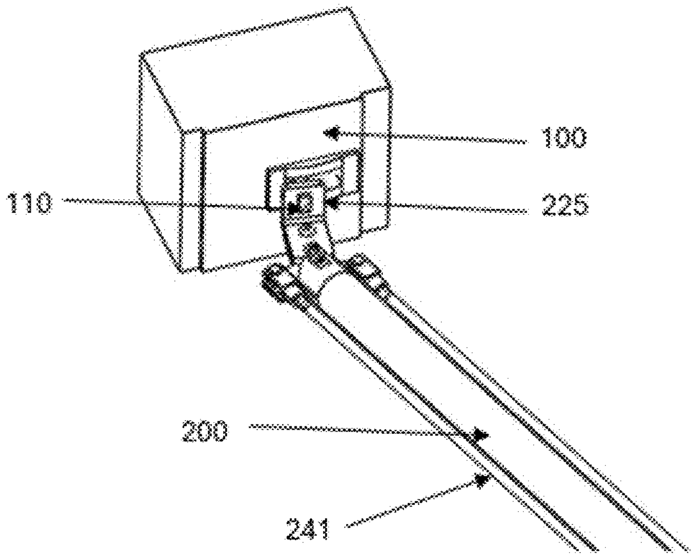
FIG. 3*b* is a perspective view of the portable actuator when the MCB is in the OFF position.

Referring now to FIG. 3*a* and FIG. 3*b* which illustrate the action of the HCD 300 in switching a MCB 100 by displacing the breaker handle from right to left. In FIG. 3*a* the circuit breaker handle engagement fixture 225 has been positioned to engage the circuit breaker handle 110. A pulling force applied to the right actuating rod 240 in the direction of the block arrow results in a torque that moves the circuit breaker handle 110 to the left as depicted in FIG. 3*b*. The process could be reversed by applying a pull force to the left actuating rod 241 which results in a torque that moves the circuit breaker handle 110 from left to right.

Figure 4:
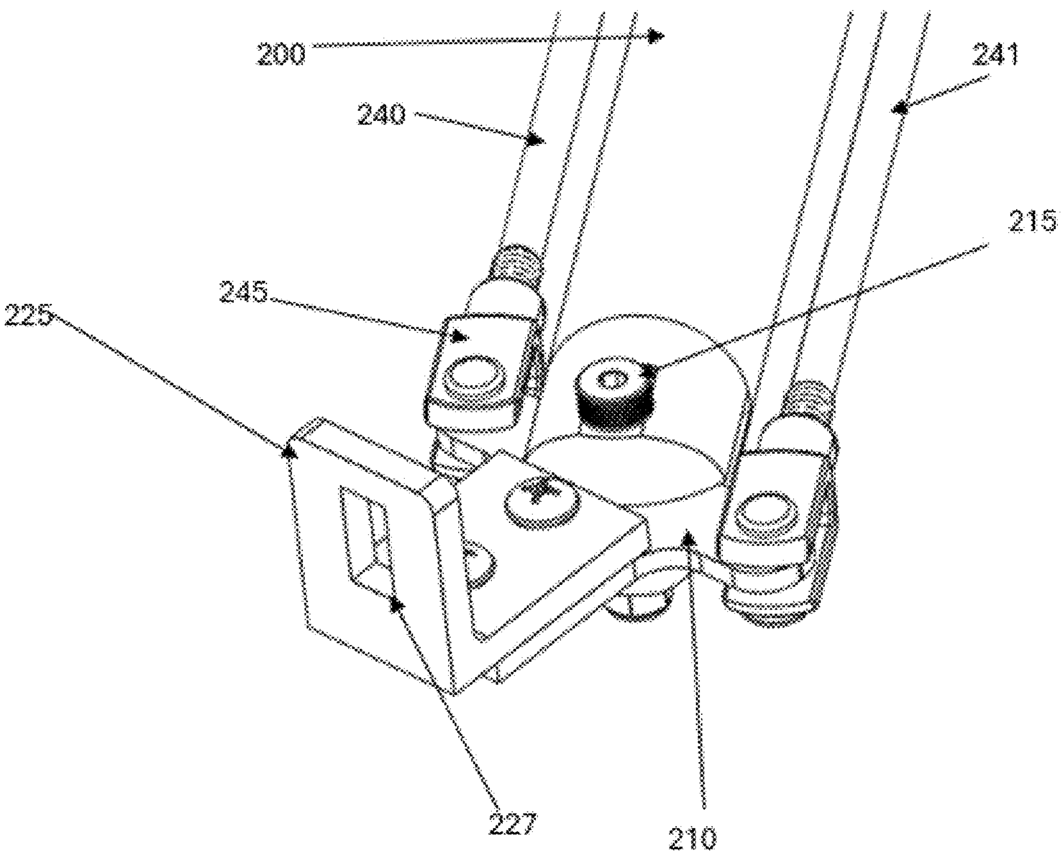
FIG. 4 is a front perspective view of the breaker handle engagement fixture.

Greater clarity of the function of the circuit breaker handle engagement fixture 225 will result from referring to FIG. 4, which is a front perspective view of the working, or actuating, end of the HCD 300. The circuit breaker handle engagement fixture 225 is fashioned to exhibit an aperture 227 whose dimensions are slightly greater than the dimensions of the type MCB handle 110 that is to be operated. The circuit breaker handle engagement fixture 225 is then affixed to the actuating short arm 210. The actuating short arm 210 can rotate about the actuating short arm pivot bolt 215, approximately 45 degrees to either side of center in the preferred embodiment. An operating torque is produced by a pulling force applied to the actuating short arm 210 by either the right actuating rod 240 or the left actuating rod 241, depending upon the desired direction of movement.

Figure 5:
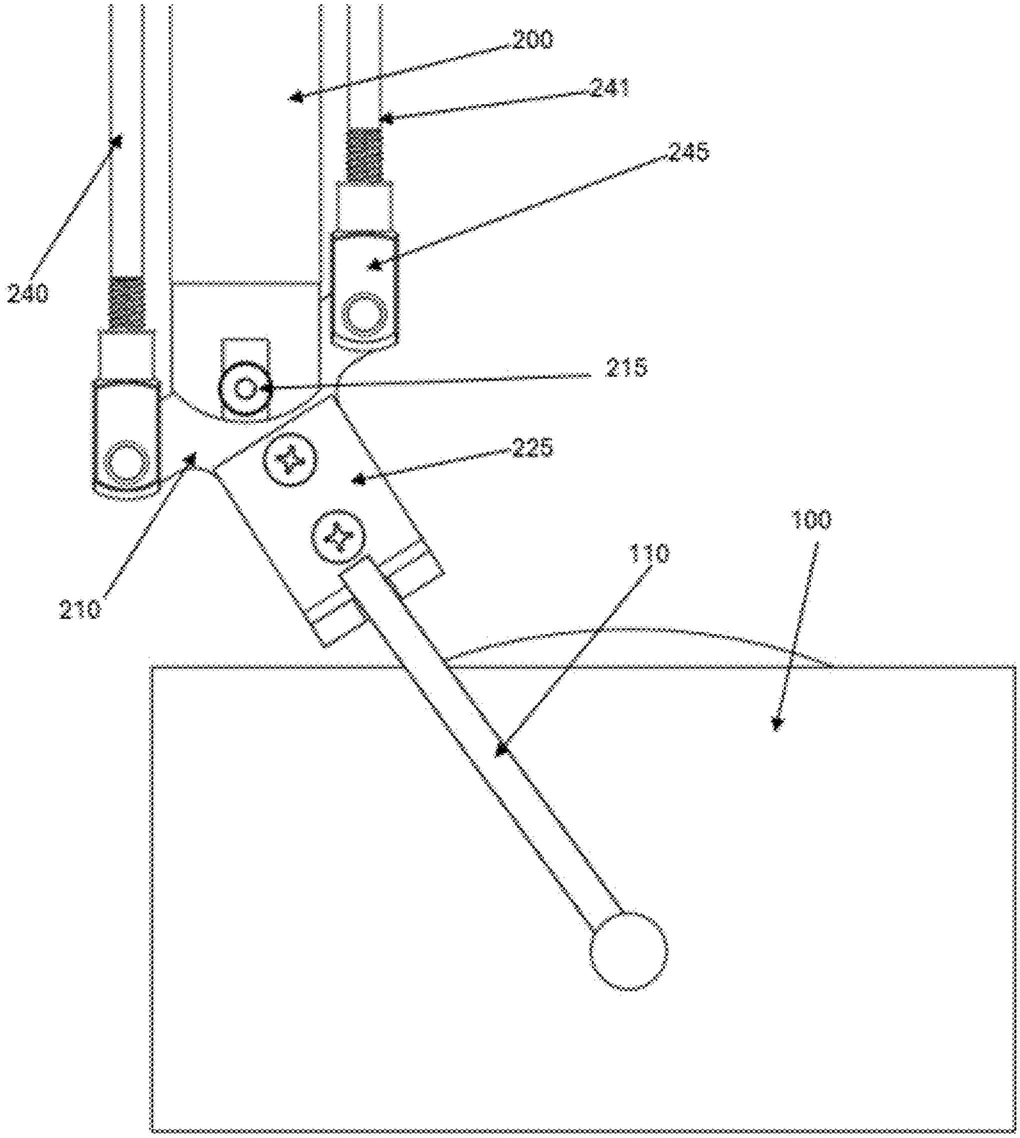
FIG. 5 is a top view of the HCD applied to MCB with the top portion of the circuit breaker handle engagement fixture cut away and the MCB case cut away for clarity.

FIG. 5 is a top view of the actuating end of the HCD 300 engaging a circuit breaker handle 110. For clarity, the circuit breaker is depicted in a cut-away view, along with a cut-away view of the circuit breaker handle engagement fixture 225. From FIG. 5, it can be clearly seen how the circuit breaker handle engagement fixture 225 and actuating short arm 210 become an extension of the circuit breaker handle 110. Moreover, it can be visualized how a force applied to the right actuating rod 240 in a direction away from the circuit breaker 100 produces a torque that results in the displacement of the circuit breaker handle 110.

Figure 6:
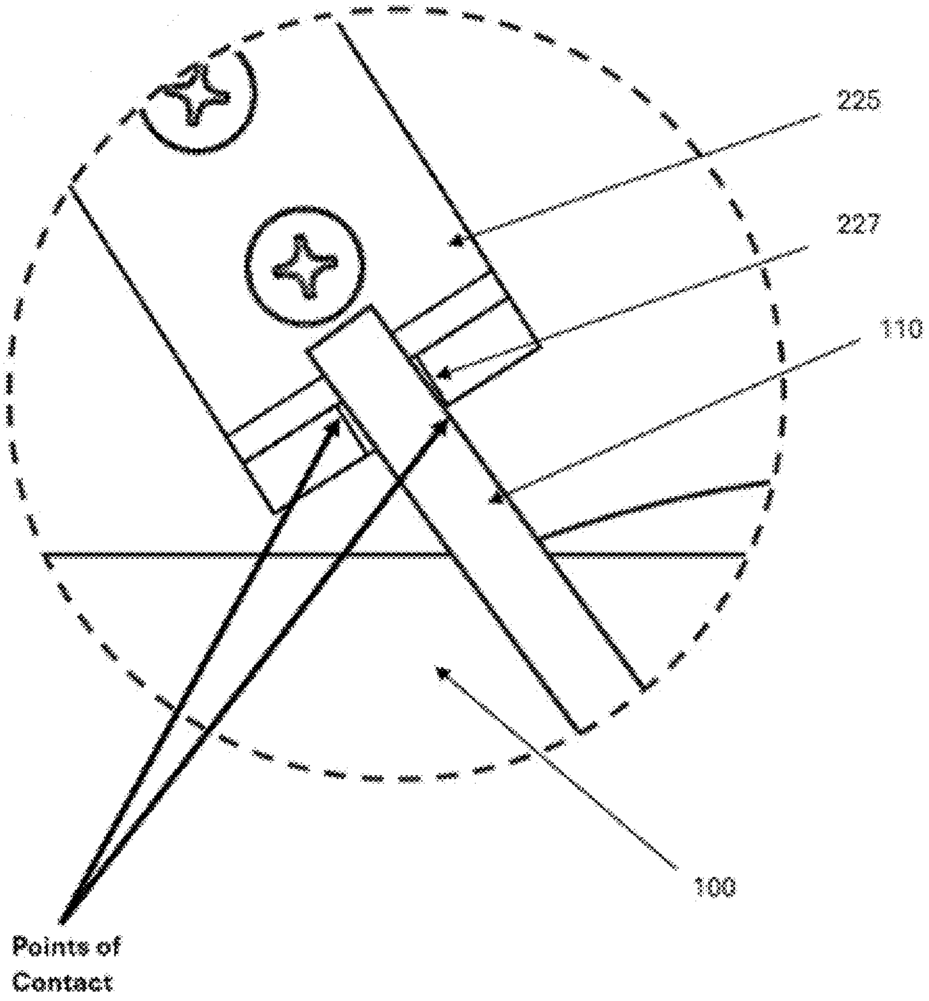
FIG. 6 is a magnified top view of a portion of FIG. 10 that depicts the circuit breaker handle engagement fixture engaging the circuit breaker handle.

FIG. 6 is a view illustrating a magnified section of FIG. 5 in the area where the circuit breaker engagement fixture 225 engages the circuit breaker handle 110. As described in the preceding paragraph referencing FIG. 5, the circuit breaker handle engagement fixture 225 is depicted as a cut-away view. It can be seen how the circuit breaker engagement fixture 225 makes contact with the circuit breaker handle 110. Owing to the fact that the aperture 227 of the circuit breaker engagement fixture 225 is slightly larger than the circuit breaker handle, as the circuit breaker engagement fixture 225 rotates relative to the circuit breaker handle 110 the edges of the circuit breaker engagement fixture aperture 227 that are diametrically opposed contact the circuit breaker handle 110, thereby producing a very strong pinching force on the circuit breaker handle 110.

Figure 7:
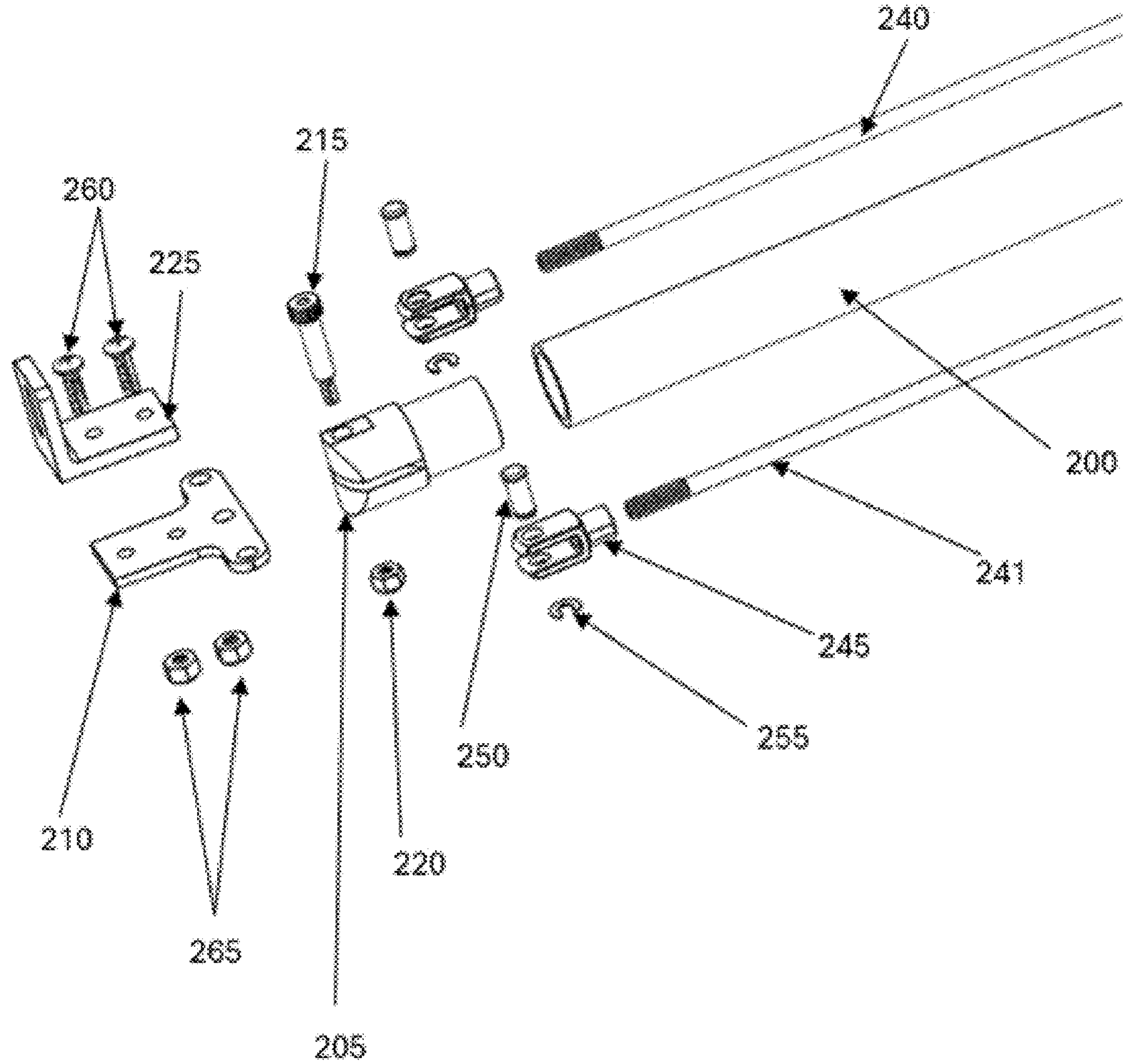
FIG. 7 is an exploded view of the breaker actuating end of the HCD.

FIG. 7 is an exploded view of the breaker-actuating-end of the HCD. Affixed to one end of the long arm 200 is the actuating-end bearing 205. The actuating short arm 210 engages a slot in the actuating-end bearing 205 and is held in place by the actuating short arm pivot bolt 215, and secured by the actuating arm pivot nut 220. A pair of elongated actuating rods 240 and 241 are attached to the right and left sides of the actuating short arm 210, preferably via clevises 245.

Figure 8:
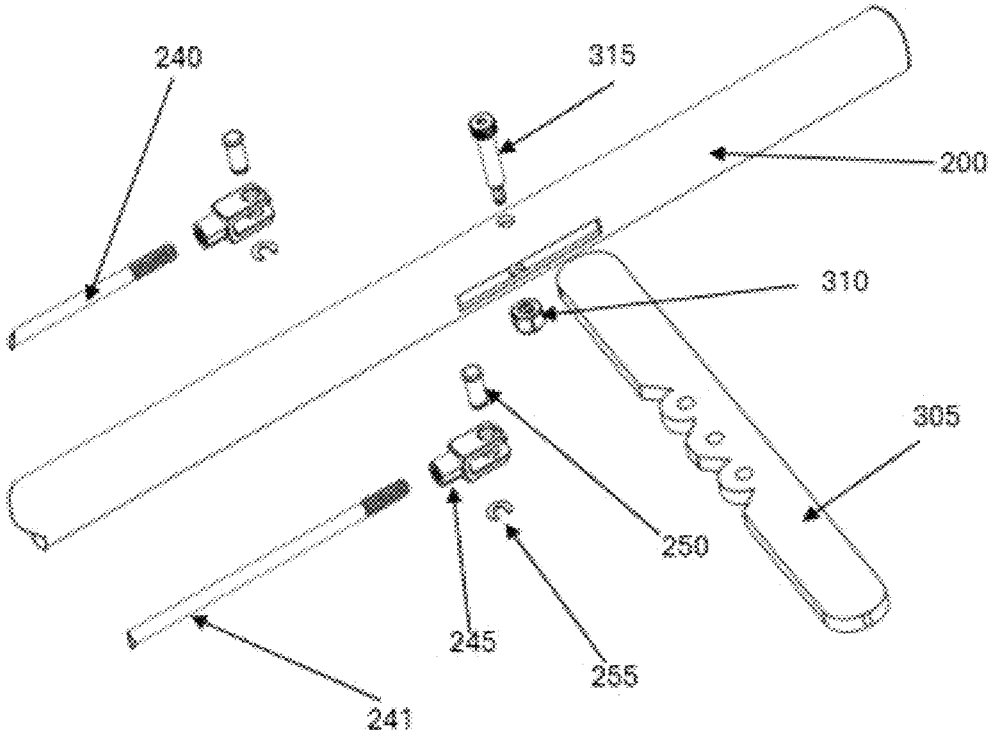
FIG. 8 is an exploded view of the manual actuating pivoting arm.

FIG. 8 is an exploded view of a typical manually-operated version of the HCD. A manually operated pivot handle 305 is inserted into a slot that is cut through the long arm 'mast' 200 of the HCD. A pivot bolt 315 and nut 310 secures the manual operating handle 305 in position. The manual operating pivot handle 305 rotates freely about the pivot bolt 315. On either side of the pivot bolt 315 the two actuating rods 240 and 241 are connected to the manual operating arm via clevises. When the manual operating handle 305 is displaced, a linear force is applied to the elongated actuating rods 240 and 241.

Note that, in the foregoing manually-operated embodiment of the HCD, the engagement fixture, actuating short arm, elongated actuating members, long arm, and manually-operated cross handle are made from one or more substantially non-conductive materials in order to further enhance safety.

Thus, the present disclosure provides a manually operated device for remotely actuating MCBs from a safe distance. The HCD enhances worker safety by reducing exposure to potential arc blast hazards in the event of breaker failure. Constructed from lightweight, non-conductive materials, the device ensures ease of use. It features an ergonomic mechanism for securely engaging and operating the breaker switch handle, allowing precise control without direct hand contact. This HCD provides an easy to use and cost-effective solution for improving electrical safety in industrial, commercial, and utility environments.

Second Embodiment

Figure 9:
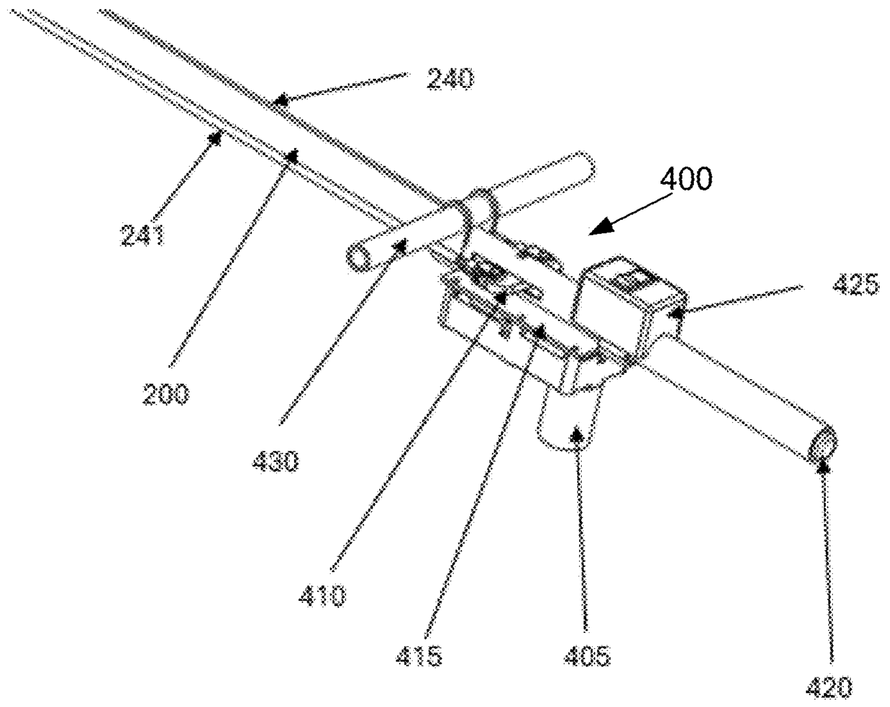
FIG. 9 is a perspective view of an electrically-driven version of the HCD.

A second embodiment of the HCD is shown in FIG. 9, wherein the actuating force is derived from an electric gear motor 405 instead of manual operation. Electric gear motors are well known and widely commercially available. They included an electrically driven motor along with one or more gears as well as associated mechanical linkage. The electric gear motor 405 is powered from a rechargeable battery 420. A control unit 425 with a momentary rocker switch that allows the electric gear motor 405 to be driven in either direction. Attached to the output shaft of the electric gear motor 405 is an actuating arm 410. A cross handle 430 is provided for securely holding the assembly 400 with one hand while the mast 200 is held with the opposing hand. This provides for ambidextrous use.

Figure 10:
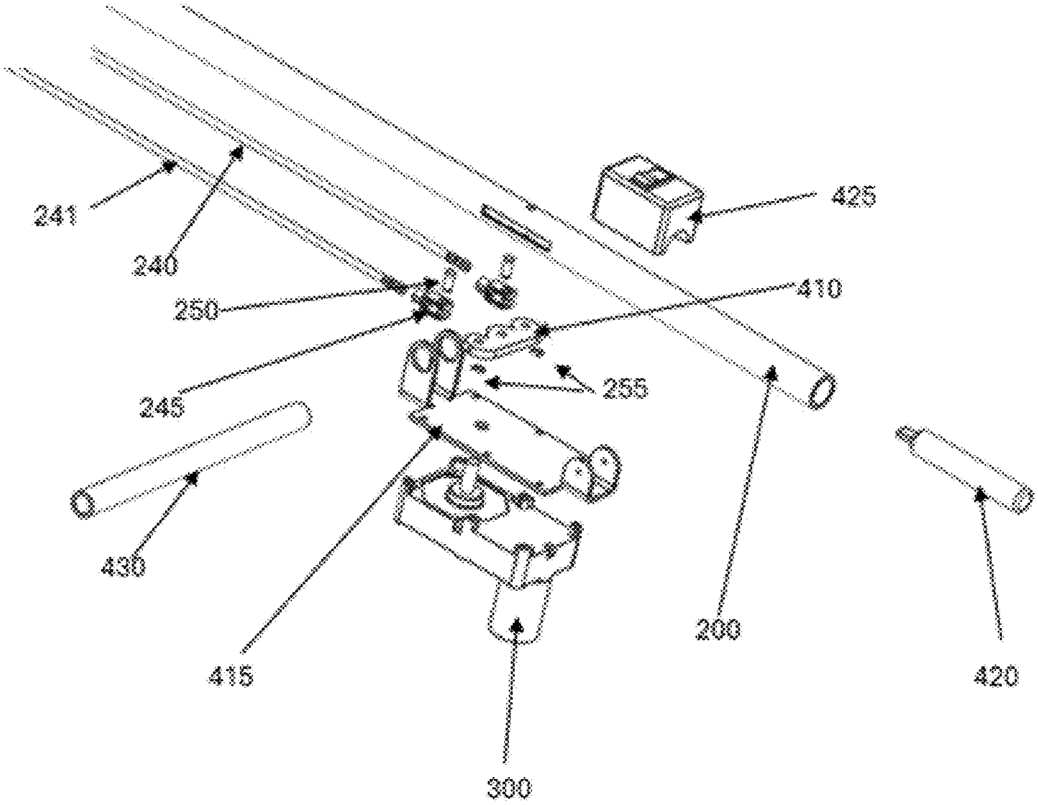
FIG. 10 depicts an exploded view of a second embodiment of the HCD, which includes a motor-driven variation of the HCD.

FIG. 10 is an exploded view of the electrically operated assembly 400. The gear motor mounting plate 415 is affixed to the long are (mast) 200. The shaft of the electric gear motor 405 extends into the longitudinal slot cut into the long arm, or mast 200. An actuating arm 410 is then attached to the shaft of the electric gear motor 415. A cross handle 430 is inserted into the gear motor mounting plate 415. A center-off momentary rocker switch 425 provides a means for the human operator to cause the electric gear motor 415 to operate in either direction. A battery 420, preferably although not necessarily rechargeable, is provided for the power to operate the electric gear motor 415.

In this second embodiment, the motor can be electrically powered with a direct current (DC) battery that is secured along with the motor. In the preferred embodiment, the control switch is a manual switch enabling at least right and left selections to enable movement of the actuating arm in rightward and leftward directions respectively.

Furthermore, in some embodiments, the motor can also be electrically powered by an alternating current (AC). In this case, the motor could have a power plug and be plugged into a wall outlet.

Figure 11A:
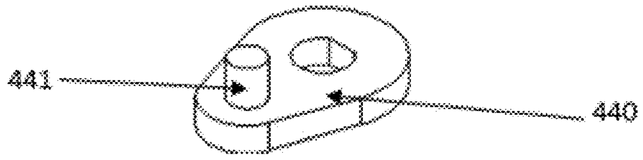
FIG. 11*a* is a perspective view of the driving element.

FIG. 11*a* is a perspective view of the driving element 440. The driving element 440 has a 'D' profile hole for engaging the gear motor shaft 450. The driving element also has a short dowel 441 protruding for engaging the actuating arm 410, which is explained more clearly in FIG. 11*b*.

Figure 11B:
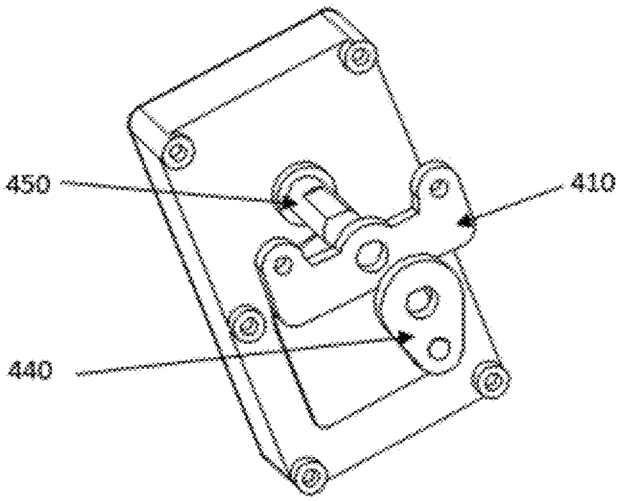
FIG. 11*b* is a perspective exploded view of the gear motor output shaft with the driving element and the actuating arm.

FIG. 11*b* is an exploded view of the gear motor output shaft 450 actuating arm 410 and driving arm 440. The gear motor output shaft 450 has a round profile for the section of the output shaft closest to the gear motor. The remainder of the gear motor output shaft 450 is machined to a 'D' profile. The actuating arm 410 is placed on the gear motor output shaft 450 to mate with the round section of the gear motor output shaft and it rotates freely on the gear motor shaft. The driving element 440 is then placed on the gear motor output shaft, engaging the 'D' profile of the gear motor output shaft 450. The driving element 440 is oriented on the gear motor output shaft 450 such that the dowel 441 will interfere with the free rotation of the actuating arm 410.

Referencing FIG. 2*b*, in order to place the HCD handle engagement fixture 225 of the HCD, the mechanism of the HCD can be moved freely between its limits of travel as shown in FIG. 12*a* whenever the gear motor is in the center position.

Moving to FIGS. 12*b* and 12*c*, when the gear motor is energized in one direction or the other such the gear motor output shaft 450 rotates along with the driving element 440. Once the dowel 441 of the driving element contacts the edge of the operating arm 440 it causes the operating arm to rotate in unison with the driving element.

MCB's are designed so that the movement of the handle is a snap action toggle function. This means that as the MCO handle is moved from one position to another, springs internal to the MCB resist the movement of the MCB handle. Upon being displaced approximately half of the travel of the MCB handle, the internal mechanism reaches a position where the stored energy in the MCB springs causes the MCB handle to snap into the extreme position that the handle was initially being moved in.

The motor-operated version of the invention accommodates the snap-action of the MCB by providing a mechanism that allows the mechanism of the MCB handle to over-run the HCD, that is, the invention does not inhibit the snap-action of the MCB.

Additionally, when the gear motor is in the center (neutral) position the MCB handle engagement fixture moves freely to facilitate engaging the circuit breaker handle engagement fixture with the operating handle of the MCB.

NOMENCLATURE

Note that in some of the embodiments described in the present disclosure (including in the claims), in connection with elements or actions, reference is made to: "right" and "left" or "rightward" or "leftward" or "forward" and "rearward." A particular perspective was adopted in the description for the sake of convenience and conveying a clear understanding of operation and use of the HCD. This characterization is merely an arbitrary example of a possible perspective for operation and use. Other perspectives could have been adopted instead, and the interpretation of these elements, operation, and use should not be limited to the adopted perspective. For instance, the HCD is suitable for operating MCB handles that are oriented to move in a vertical direction, as opposed to the horizontal direction, in which case, reference to "up" and "down" and similar perspective-dependent terminology could have been used.

Variations and Modifications

Finally, it should be emphasized that the above-described embodiment(s) of the HCD is merely a possible nonlimiting example of an implementation, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

As an example of a possible variation, in some embodiments, the operating force applied by the actuating arm can be transmitted by a drive shaft and bevel gear pair.

As another example of a possible variation, the operating force applied to the actuating arm can be transmitted by a chain sprocket and chain.

As yet another example of a possible variation, the operating force applied to the actuating arm can be transmitted by a drive shaft and worm gear and worm wheel pair.

Also, note that the embodiments of the HCD can be utilized in connection with any type of circuit breaker or other device that is operated with a switch handle as described and shown in this disclosure.

PART REFERENCE NUMERALS

Molded Case Breaker
- 100 Molded Case Breaker
- 110 Molded Case Breaker Handle Universal Parts
- 200 Long arm (mast)
- 205 Actuating End Bearing
- 210 Actuating Short Arm
- 215 Actuating Arm Pivot Bolt
- 220 Actuating Arm Pivot Nut
- 225 Breaker Handle Engagement Fixture
- 227 Breaker Handle Engagement Fixture Aperture
- 230 Breaker Handle Engagement Fixture Mounting Screws
- 235 Breaker Handle Engagement Fixture Mounting Nuts
- 240 Actuating Rod (right)
- 241 Actuating Rod (left)
- 245 Actuating Rod Clevis End
- 250 Actuating Rod Clevis End Pin
- 255 Actuating Rod Clevis End Pin Locking Clip
- 260 Engagement Fixture Mounting Screw
- 265 Engagement Fixture Mounting Nut Manually Operated
- 300 Manually Operated Assembly
- 305 Manual Operating Pivot Handle
- 310 Manual Operating Pivot Handle Pivot Nut
- 315 Manual Operating Pivot Handle Pivot Bolt Motor Operated
- 400 Electrically-operated Assembly
- 405 Electric Gear Motor
- 410 Motor-Driven Actuating Arm
- 415 Gear Motor Mounting Plate
- 420 Battery
- 425 Center-off Momentary Rocker Switch
- 430 Cross Handle
- 440 Driving Member
- 441 Driving Member Dowel
- 450 Electric Gear Motor Shaft At least the following is claimed:

1. A handheld control device (HCD) for safely operating molded case circuit breakers by remote operation, the handheld control device comprising:

a circuit breaker handle engagement fixture having a body, the fixture body defining an aperture shaped and sized to receive therein a circuit breaker handle of a molded case circuit breaker;

an actuating first arm, the actuating first arm having a longitudinal body extending between right and left end portions, the fixture body attached to a central part of the arm longitudinal body;

right and left actuating members, each actuating member having a longitudinal body extending between controlling and working end portions, each of the working end portions moveably attached to a respective actuating first arm end portion;

a second arm having a longitudinal body extending between and along the right and left actuating members;

a pivot handle having a longitudinal body extending between right and left end portions, the pivot handle body pivotally attached to the second arm, each of the pivot handle end portions moveably attached to a respective controlling end portion of a respective actuating member; and wherein the engagement fixture is capable of moving the circuit breaker handle when the pivot handle is manually moved by an operator relative to the second arm.

2. The device of claim 1, wherein the actuating members are of sufficient length to diminish the risks of an electrical arcing of the circuit breaker when its handle is actuated rightward or leftward without exposure of the arcing at the controlling end portions of the actuating members.

3. The device of claim 1, wherein the right and left actuating members are rigid rods.

4. The device of claim 1, wherein the right and left actuating members are flexible cables.

5. The device of claim 1, wherein the fixture, actuating arm, actuating members, second arm, and cross handle are made from one or more substantially non-conductive materials.

6. The device of claim 1, wherein:

the actuating first arm is generally planar and T-shaped with right and left extensions that extend from a perpendicular central part;

the right and left actuating members are generally parallel and are moveably attached to the right and left extensions respectively; and the second arm is moveably attached to the central part.

7. The device of claim 6, wherein, operationally, (a) when the right end portion of the cross handle is moved forward or rearward, the right actuating member is moved forward or rearward respectively, and the actuating first arm is rotated leftward or rightward respectively to move the fixture leftward or rightward respectively, and (b) when the left end portion of the cross handle is moved forward or rearward, the left actuating member is moved forward or rearward respectively, and the actuating first arm is rotated rightward or leftward respectively to move the fixture rightward or leftward respectively.

8. The device of claim 7, wherein the fixture body is L-shaped at a right angle with perpendicular first and second generally planar plates, the first plate defining the aperture with a rectangular periphery and with a size slightly larger than the circuit breaker handle, the second plate fixedly attached to the actuating first arm.

9. A handheld control device (HCD) for safely operating molded case circuit breakers by remote operation, the handheld device comprising:

a circuit breaker handle engagement fixture having a body, the fixture body defining an aperture shaped and sized to receive therein a circuit breaker handle of a molded case circuit breaker;

an actuating first arm, the actuating first arm having a longitudinal body extending between right and left end portions, the fixture body attached to a central part of the arm longitudinal body;

right and left actuating members, each actuating member having a longitudinal body extending between controlling and working end portions, each of the working end portions moveably attached to a respective actuating first arm end portion;

a second arm having a longitudinal body extending between and along the right and left actuating members;

a motor-driven actuating arm having a longitudinal body extending between right and left end portions, a central part of the actuating arm pivotally attached to the second arm, each of the motor-driven actuating arm end portions moveably attached to a respective controlling end portion of a respective actuating member;

an electric gear motor having a rotatable drive shaft, the motor-driven actuating arm being rotatable via the shaft in order to move forward and rearward each of the right and left end portions; and a control switch connected to the motor to enable selective control of movement of the motor-driven actuating arm.

10. The device of claim 9, wherein the fixture body is L-shaped at a right angle with perpendicular first and second generally planar plates, the first plate defining the aperture with a rectangular periphery and with a size slightly larger than the circuit breaker handle, the second plate fixedly attached to the actuating first arm.

11. The device of claim 9, wherein the motor is electrically powered with a direct current (DC) battery that is secured along with the motor and wherein the control switch is a manual switch enabling at least right and left selections to enable movement of the actuating arm in rightward and leftward directions respectively.

12. The device of claim 9, wherein the motor is electrically powered by an alternating current (AC).

13. The device of claim 9, wherein the actuating members are of sufficient length to diminish the risk of electrical arcing caused by a failure of the circuit breaker when its handle is actuated rightward or leftward.

14. The device of claim 9, wherein the right and left actuating members are rigid rods.

15. The device of claim 9, wherein the right and left actuating members are flexible cables.

16. The device of claim 9, wherein the fixture, actuating first arm, actuating members, second arm, and motor-driven actuating arm are made from one or more substantially non-conductive materials.

17. The device of claim 9, wherein:

the actuating first arm is generally planar and T-shaped with right and left extensions that extend from a perpendicular central part;

the right and actuating members are generally parallel and are moveably attached to the right and left extensions respectively; and the second arm is moveably attached to the central part.

18. The device of claim 17, wherein, operationally, (a) when the right end portion of the motor-driven actuating arm is moved forward or rearward, the right actuating member is moved forward or rearward respectively, and the actuating first arm is rotated leftward or rightward respectively to move the fixture leftward or rightward respectively, and (b) when the left end portion of the motor-driven actuating arm is moved forward or rearward, the left actuating member is moved forward or rearward respectively, and the actuating first arm is rotated rightward or leftward respectively to move the fixture rightward or leftward respectively.

19. A handheld control device (HCD) for actuating an electrical circuit breaker with a circuit breaker handle that extends outwardly from the circuit breaker and that is moved between an on position and an off position to close and open a molded case circuit breaker, the handheld control device comprising:

handle actuation means for enabling removable engagement and disengagement of the circuit breaker handle and for moving the handle in a direction toward the on position and in an opposite direction toward the off position;

a second arm having a longitudinal body extending between a working end portion and a controlling end portion, the second arm body extending sufficiently to reduce any hazardous electrical arc exposure at the controlling end portion when the circuit breaker is actuated; and control means situated at the controlling end portion of the second arm, the control means for controlling the handle actuation means to move the circuit breaker handle in the directions.

20. The device of claim 19, wherein the handle actuation means comprises:

a circuit breaker handle engagement fixture having a body, the fixture body defining an aperture shaped and sized to receive therein the circuit breaker handle of the molded case circuit breaker;

an actuating first arm, the actuating first arm having a longitudinal body extending between right and left end portions, the fixture body attached to a central part of the arm longitudinal body; and right and left actuating members, each actuating member having a longitudinal body extending between controlling and working end portions, each of the working end portions moveably attached to a respective actuating first arm end portion.

21. The device of claim 20, wherein the control means comprises:

a cross handle having a longitudinal body extending between right and left end portions, the cross handle body moveably attached to the second arm, each of the cross handle end portions moveably attached to a respective controlling end portion of a respective actuating member; and wherein the engagement fixture is capable of moving the circuit breaker handle when the cross handle is manually moved relative to the second arm.

22. The device of claim 20, wherein the right and left actuating members are rigid rods.

23. The device of claim 20, wherein the right and left actuating members are flexible cables.

24. The device of claim 20, wherein the control means comprises:

a motor-driven actuating arm having a longitudinal body extending between right and left end portions, a central part of the actuating arm pivotally attached to the second arm, each of the pivot handle end portions moveably attached to a respective controlling end portion of a respective actuating member;

an electric gear motor having a rotatable drive shaft, the motor-driven actuating arm being rotatable via the shaft in order to move forward and rearward each of the right and left end portions;

a manually operated control switch connected to the motor to enable selective control of movement of the motor-driven actuating arm; and wherein the engagement fixture is capable of moving the circuit breaker handle when the motor-driven actuating arm is moved relative to the second arm with the rotatable drive shaft.

25. The device of claim 24, wherein the motor is electrically powered with a direct current (DC) battery that is secured along with the motor and wherein the control switch is a manual switch enabling at least right and left selections to enable movement of the actuating arm in rightward and leftward directions respectively.

26. The device of claim 24, wherein the motor is electrically powered by an alternating current (AC).

* * * * *